United States Patent [19]

Kakade

[11] 4,079,155

[45] Mar. 14, 1978

[54] METHOD OF TREATING SOYBEANS AND PRODUCT THEREOF

[75] Inventor: Madhu L. Kakade, St. Paul, Minn.

[73] Assignee: Land O'Lakes, Inc., Minneapolis, Minn.

[21] Appl. No.: 752,457

[22] Filed: Dec. 20, 1976

[51] Int. Cl.² ............................................. A23J 3/00
[52] U.S. Cl. ................................... 426/634; 426/430; 426/431; 426/442; 426/486
[58] Field of Search ............... 426/511, 634, 430, 431, 426/807, 623, 635, 486, 442, 478

[56] References Cited

U.S. PATENT DOCUMENTS

| | | | |
|---|---|---|---|
| 2,444,241 | 6/1948 | Beckel et al. | 426/564 |
| 2,615,905 | 10/1952 | Forstmann et al. | 426/629 |
| 3,023,107 | 2/1962 | Mustakas et al. | 426/430 |
| 3,043,826 | 7/1962 | Beaber et al. | 426/430 |
| 3,170,802 | 2/1965 | Fukushima | 426/46 |
| 3,268,503 | 8/1966 | Mustakas et al. | 426/634 |
| 3,721,569 | 3/1973 | Steinkraus et al. | 426/430 |
| 3,891,774 | 6/1975 | Baker et al. | 426/104 |
| 3,925,569 | 12/1975 | Daftary | 426/634 |

*Primary Examiner*—R. B. Penland
*Attorney, Agent, or Firm*—Frederick E. Lange

[57] ABSTRACT

A bland, nutritive, water-retentive soybean flour, concentrate, or other food product is produced by a process involving heating soybean material under superatmospheric pressure and in contact with alcohol and water and/or their vapors while permitting continuous escape of vapors.

6 Claims, No Drawings

METHOD OF TREATING SOYBEANS AND PRODUCT THEREOF

This invention relates to the preparation of improved high-protein food products from soybeans. In one aspect the invention relates to the preparation of improved soybean food products wherein substantially all of the protein is digestible and which are substantially free from undesirable flavor components, i.e. which have a bland taste. In another aspect, the invention relates to the preparation of bland, nutritive soybean products, particularly soybean flour or soybean concentrate, having good water-binding properties and therefore of particular value in baked goods and other food products.

Alcohols have been used as solvents in the extraction of oil from soybeans, as noted for example in the two volume treatise on "Soybeans and Soybean products," edited by Markley, Interscience, 1950. In one instance, mentioned by the editor as being described by Beckel and Smith in Vol. 16 of "Food Industries", 1944, pages 616-644, alcohol with a small proportion of water was used under pressure to extract the oil while avoiding denaturation of the protein. More recently, Danji Fukushima, in U.S. Pat. No. 3,170,802, describes the treatment of soybean material with alcohol and water at an elevated temperature as a preliminary step in the protease hydrolysis of the soybean protein in the preparation of an improved soy sauce. Treatment is carried out either under atmospheric pressure or elevated pressure in a completely closed vessel. Treatment with alcohol in liquid or vapor state is said by Fukushima to produce a soybean product containing a greater amount of digestible protein than is obtained by ordinary autoclaving. However, the treatment has not been found effective in removing certain undesirable flavor constituents and in producing a bland product. Since Fukushima is only concerned with using the product to produce soy sauce by hydrolyzing of the product, it is not as important in his case that the product be bland.

I have now discovered a modified process for treating soybean material, with which a further improvement in digestibility and blandness of soybean flour, concentrate or other similar food product may be obtained. The process may be applied to full-fat low-fat, or defatted cracked beans, flakes, grits or flour, although its greatest field of utilization appears presently to be in the treatment of defatted flour. Pretreated and partially denatured soybean materials, such, for example, as have been heat-treated during extraction, tempering, flaking or grinding, may also be improved by my process, including such materials as those partially denatured products having a protein dispersibility index (PDI) of as low as 20 or 30.

My novel process involves subjecting the soybean material in a thin layer to alcohol vapor or alcohol-water vapor, under a temperature of at least about 220° F. and at superatmospheric pressure, and maintaining the pressure and temperature for the required time while continuously permitting slow release of vapor from the system. Under these temperature and pressure conditions, certain of the undesirable flavor constituents are volatilized and tend to be carried off with the escaping vapors.

Methyl, ethyl and isopropyl alcohol are each useful in the process. In a preferred system, a minor amount of water is initially present, and more is added during the treatment in the form of live steam.

The soybean material may be supplied in a thin layer on trays or on a belt, or may be continuously tumbled or otherwise agitated or suspended within the pressure vessel to assure uniform and complete treatment. Either batch or continuous process may be used.

A pressure of approximately 5 to 15 psi gage, and a temperature of about 220° to 240° F. for a period of approximately twenty minutes to one-half hour is required for fully effective treatment, with ethyl alcohol and water, of soybean material in particulate form. These requirements are subject to some variation depending upon the particular alcohol and the particular soybean material employed, but in all cases will be so selected as to reduce the PDI to well below the initial value, and generally to a final value of no higher than about twenty.

The protein dispersibility index is a measure of the solubility in water of the protein content of the soybean material, and decreases with increasing denaturation. The PDI of the raw soybean material is generally about 90.

Other means for supplying heat to the mixture may be employed, but continuous introduction of live steam has a number of advantages and is presently preferred.

Release of vapor from the pressure chamber during the treating process should be at a rate of at least about 0.5 cubic foot per hour per pound of soybean material under treatment. Greater rates are not precluded but are not ordinarily necessary and are less economical. Some variations in minimum flow rate are to be expected with changes in dimensions and capacities of equipment, but the above-noted rate as determined for a batch process using an apparatus having a treating capacity of 60 pounds of soybean flour is representative.

The low PDI value of about ten, obtained in soybean materials processed in accordance with my invention, makes possible the preparation of a high protein concentrate with minimal loss of protein values. Simmple water extraction removes the water-soluble and non-nutritive carbohydrate components, without appreciable loss of the protein, to yield, after drying, a concentrate containing at least about 70% of digestible protein. The high protein content and the substantial absence of undesirable flavor constituents render the product particularly attractive as a food supplement.

The following example will serve further to illustrate the practice of the invention, which, however, is not to be limited thereto.

EXAMPLE NO. 1

Sixty pounds of commercial defatted soybean flour having a PDI of 90 was mixed and uniformly wetted with 33.7 pounds of 95% ethyl alcohol and 6.3 pounds of water. The mass was spread to a uniform depth of one cm. onto shallow trays which were loaded into a retort fitted for introduction of live steam and supplied with a pressure gage and steam outlet valve. Thermocouples for measuring the temperature of the mass were installed in place. Steam was introduced and the outlet valve partially opened. A pressure of 15 psi was maintained within the retort, and a vapor flow of 60 cu. ft. per hour was maintained from the outlet valve. The temperature of the flour mixture rose to 250° F. in just under ten minutes. The treatment was continued for 30 minutes, during which time steam was continually introduced, while the vapor flow through the outlet valve continued and the temperature and pressure were maintained at the above values. Steam input was then discontinued, and the material removed from the retort. The flour mixture appeared damp, and contained alcohol as determined by the odor. It was mixed with water to form a sprayable suspension which was spray dried in a drying chamber.

The dried product was taste tested by several experienced persons and found to be bland and to have no disagreeable flavor.

The treated flour was further tested for nutritive value in an animal feeding test in comparison with casein and with conventional heat-treated defatted soybean flour, as a source of protein. The flours were dispersed in water prior to feeding, and the several materials were then fed to young calves in a controlled feeding experiment, with results as follows: Gain in weight, lbs., during four week test.

| | Feedstock | | |
| Trial No. | Casein | Heated soy flour | Soy flour of Example |
| --- | --- | --- | --- |
| 1 | 28.70 | 23.60 | 30.60 |
| 2 | 26.50 | 22.92 | 26.58 |
| 3 | 29.88 | — | 30.66 |

The results of the feeding test show that the nutritive value of the soy flour treated as described in the Example exceeds that of conventional heat treated soy flour and was similar to that of casein.

A further portion of the treated flour was placed in an extraction apparatus and extracted to constant weight with water. The resulting concentrate was found to assay more than 70% protein and had a bland taste. Used in the preparation of turkey rolls, it contributed to the water retention properties of the roll to provide a more tender and palatable product.

EXAMPLE NO. 2

As in Example No. 1, 60 lbs. of commercial defatted soybean flour having a PDI of 90 was mixed and uniformly wetted with 33 lbs. of Type IIIA specially denatured alcohol (a common commercial mixture containing about 95% ethyl alcohol and 5% methyl alcohol) and 7.0 lbs. of water. These ingredients were mixed in a mixer commercially known as the "Littleford" reactor for two minutes. This mixer has a jacket of steam surrounding it and has provision for the injection of direct steam into the mixer. Live steam was then introduced into the mixer and into the steam jacket surrounding the mixer until the temperature reached 180° F. The "Littleford" mixer is provided with a restricted outlet. The temperatures were observed by thermometers associated with the mixer. A pressure of 5 psi was maintained within the mixer and vapors were allowed to escape continuously through the restricted outlet. The temperature of the mixture rose to 180° F. in just about ten minutes. Steam input to the jacket was then discontinued. This condition was maintained for about 30 minutes during which time the input of direct steam into the mixture was continued, steam continuously escaping through the restricted outlet to maintain 5 psi pressure in the mixer. During this time, the temperature rose to 220° F. Cooling water was then introduced into the jacket and air was introduced into the mixer to cool the flour mixture. The material was then removed from the mixer. Again, the dried product was tasted by several experienced persons and found to be bland and have no disagreeable flavor. The taste of the product was far superior to products made by conventional methods employed for increasing the digestibility of soybeans.

It will be seen that I have provided a new process for producing a bland nutritive water-retentive soybean flour and a concentrate thereof. While I have described certain specific embodiments, it is to be understood that the scope of the invention is limited solely by that of the appended claims.

I claim:

1. The process of treating soybeans, comprising: uniformly subjecting proteinaceous soybean material selected from the group consisting of full-fat, low-fat and defatted soybeans and having a PDI of at least about 20 to vapors, comprising a lower alcohol vapor, in a pressure chamber under superatmospheric pressure while simultaneously causing a slow continuous removal of vapors from said chamber at a rate of at least about 0.5 cubic foot per hour per pound of said material, said chamber being maintained at a pressure of at least 5 PSI gauge, by means of continuous addition of heated vapors at a temperature of at least about 220° F. for at least 20 minutes so that a substantial reduction of the PDI of the material occurs 2. The process of claim 1 wherein said soybean material is defatted soybean flour havng a PDI of about 90, said alcohol is ethyl alcohol, said temperature is about 250° F. and said time is about one-half hour.

3. The process of claim 2 wherein said flour and alcohol are initially present in a ratio of about 2:1 by weight.

4. The process of claim 1 in which the proteinaceous soybean material is mixed with water and alcohol in liquid form prior to being placed in said chamber.

5. The process of claim 1 wherein is included the further step of aqueous extraction of the vapor-treated material to remove water-soluble carbohydrates and provide a protein concentrate.

6. A bland, highly nutritive protein concentrate of at least about 70% protein, prepared by the process of claim 5.

* * * * *